Aug. 12, 1924.   1,504,591
I. O. WRIGHT
DRAFT RIGGING
Filed Feb. 11, 1919   4 Sheets-Sheet 1
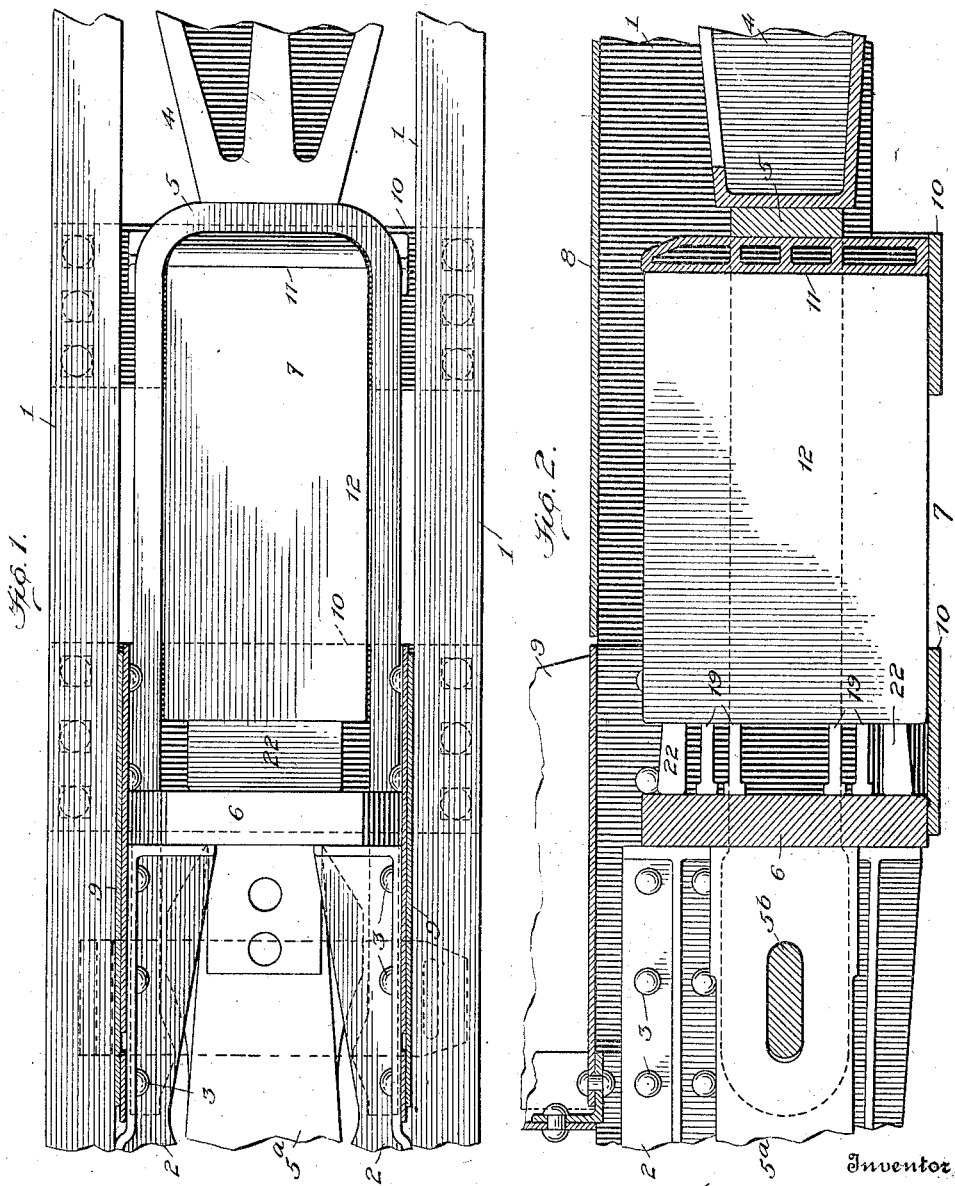

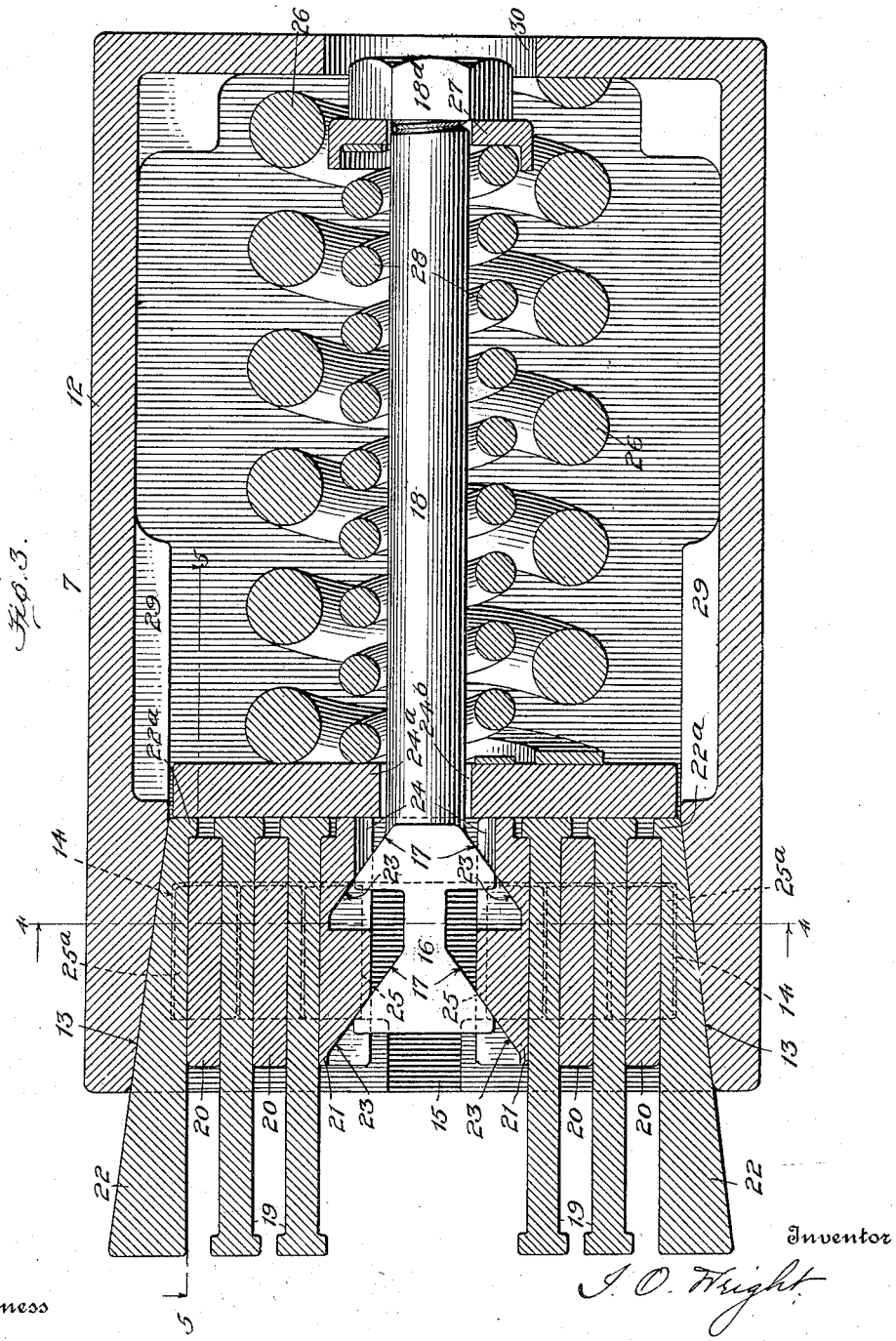

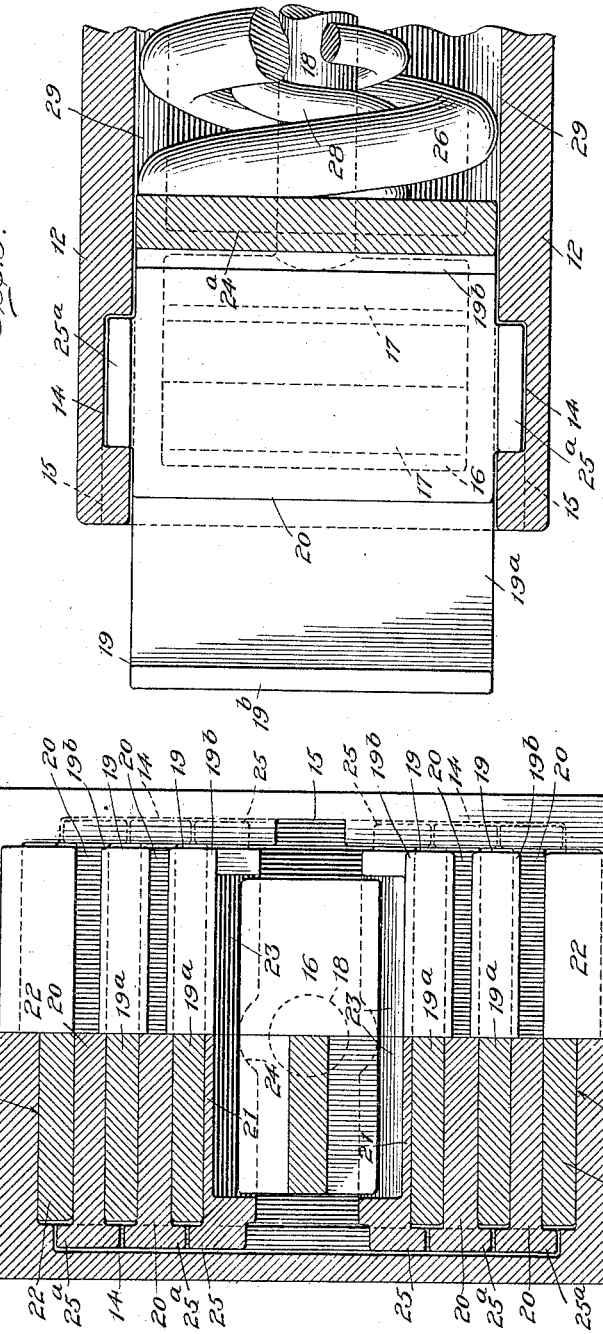

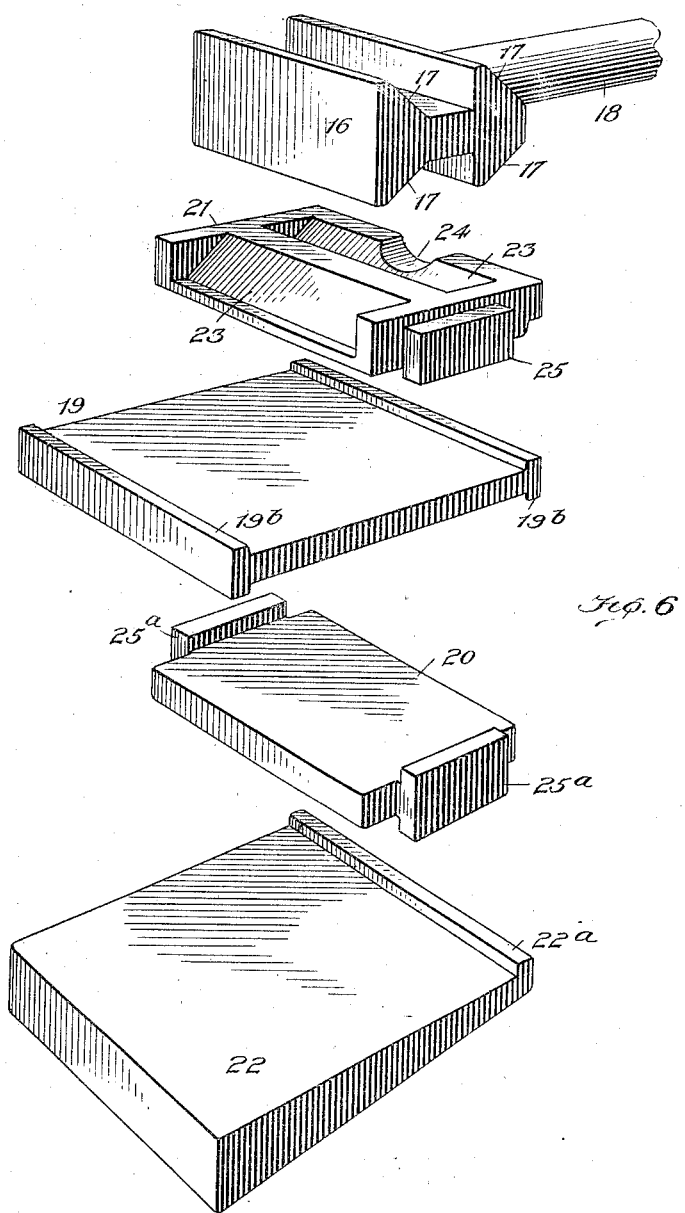

Patented Aug. 12, 1924.

1,504,591

UNITED STATES PATENT OFFICE.

IRA ORVILLE WRIGHT, OF BALTIMORE, MARYLAND, ASSIGNOR TO THE T. H. SYMINGTON COMPANY, OF NEW YORK, N. Y., A CORPORATION OF DELAWARE.

DRAFT RIGGING.

Application filed February 11, 1919. Serial No. 276,287.

*To all whom it may concern:*

Be it known that I, IRA ORVILLE WRIGHT, a citizen of the United States, residing at Baltimore, in the State of Maryland, have invented certain new and useful Improvements in Draft Rigging; and I do hereby declare the following to be a full, clear, and exact description of the invention, such as will enable others skilled in the art to which it appertains to make and use the same.

This invention relates to improvements in shock absorbing mechanism and more particularly to the type of mechanism which is especially designed for use as the cushioning device or unit of a railway car draft rigging. To this end the principal object of my invention, broadly considered, is to provide a shock absorbing unit insertable within the limits prescribed in car construction, said unit being so constructed and arranged as to provide a relatively gradual but constantly increasing resistance to the compressive strains and an ultimate high absorptive capacity to such strains together with a positive and gradual frictional release.

Another object of the invention is to provide a shock absorbing mechanism having a plurality of interlocking friction elements, whereby said device is self-contained and may be shipped as a unit properly assembled thereby avoiding all chance of loss or displacement of the component parts.

Another object of my invention is to provide a shock absorbing unit or frictional draft gear having a plurality of renewable frictional surfaces.

Another object of my invention is to provide a friction draft gear in which the wear of the several elements will be automatically compensated for so that the gear will at all times force the follower plates into contact with the stop shoulders of the draft rigging, thereby avoiding slack or slap between the followers and the stops which is one of the disadvantages of draft riggings now in general use.

Another object of my invention is to provide a friction draft gear in which one or more of the cushioning elements is so related to the friction elements as to cause the same to be compressed from both ends upon a movement of the friction elements with relation to each other.

Another object of my invention is to provide a shock absorbing device or frictional draft gear in which some of the friction elements have a combined longitudinal and transverse movement and other friction elements have only a transverse movement.

Still another object of the invention is to provide a shock absorbing mechanism involving a casing and friction elements included thereby or therein in which the movement of one friction element with respect to another under compressive strains will cause a differential compression of a resilient element (hereinafter referred to as the friction producing spring) by compressing the same from opposite ends.

There are many other objects of the invention which will appear from the more detailed description thereof when taken in connection with the accompanying drawings, which have been chosen to illustrate one embodiment of my invention and in which, Figure 1 is a top plan view of a portion of a car underframe and the associated draft rigging showing the application of my draft gear or shock absorbing mechanism thereto;

Figure 2 is a longitudinal central section of Figure 1, the shock absorbing or cushioning element, being shown in side elevation;

Figure 3 is a longitudinal vertical section of the cushioning element of the draft rigging portions whereof are shown in elevation for clearness;

Figure 4 is a half section, half elevation, the section being taken on the line 4—4 of Figure 3;

Figure 5 is a transverse section on line 5—5 of Figure 3; and

Figure 6 is a perspective view of some of the friction elements of the draft rigging showing the mode of relation between the various elements.

Referring to the drawings, 1—1 designate the center or draft sills of a railway car, 2 the front stops or stop lugs which may be connected to the inner vertical faces of the center draft sills 1, by means of rivets or other suitable fastening means 3. The back stop designated by the reference number 4 is preferably positioned in rear of and in contact with the rear portion of the yoke 5, which is operatively connected to the coupler 5ª by means of the key 5ᵇ and located between the rear portion of the yoke 5 and a follower 6 is the friction element or cushioning mechanism 7. In Figures 1 and 2 the numeral 8 designates the car floor, 9 the end bracing and 10—10 the bottom tie straps for supporting the friction gear or cushioning member 7. A rear follower 11 may be interposed between the friction member 7 and the rear end of the yoke 5, as shown in Figure 2.

The friction or cushioning element 7 preferably comprises a casing or housing 12 which may be, and preferably is, substantially rectangular in section. This casing 12 is preferably provided at or adjacent one end with a pair of oppositely disposed inclined or wedging faces 13, 13, the said faces being inclined to the longitudinal axis of the casing and preferably converging rearwardly or inwardly. Intermediate the said inclined faces 13, the side walls of the casing 12 are each preferably provided with a T-shaped groove 14, the head of the T extending transversely between the said faces 13 and the shank of the T, extending outwardly of the casing, as shown at 15.

The numeral 16 designates a stepped wedge faced plunger, the said plunger being provided adjacent one end with inwardly directed oppositely disposed pairs of wedging faces 17, the said wedge being preferably provided with an integral longitudinally extending rod or stem 18 which may be, and preferably is, provided at its rear end with an adjustable collar or nut 18ª.

The plunger 16 is preferably disposed centrally of the casing 12 and is normally spaced from the open end of the same. Interposed between each side face of the plunger and the adjacent inclined face 13 of the casing 12 is a plurality of friction elements which may and preferably do comprise alternately arranged plates 19 and 20 and a plurality of wedge faced blocks 21 and 22. The blocks 21 are each provided with wedging faces 23 corresponding to and coacting with the wedge faces 17 of the plunger 16. It is to be understood that although I have shown the plunger and the blocks 21 each provided with two coacting wedge faces, the number of these faces may be increased or diminished as desired. Adjacent their inner ends the wedge blocks 21 are each provided with a recess 24, corresponding to the adjacent portion of the stem 18 of the plunger 16. These recesses are provided to permit the blocks 21 to slide inwardly or transversely of the casing the necessary or desired extent without contacting with the stem 18 of the plunger. The blocks 21 are each provided with laterally extending lugs 25 which may be and preferably are substantially L-shaped. These lugs 25 are adapted to seat in the transversely extending grooves 14 of the casing 12 and serve to hold the blocks 21 from longitudinal movement with respect to the said casing.

The blocks or plates 20 are preferably longitudinally disposed and are likewise provided with laterally extending lugs 25ª which may for convenience be formed as T-shaped members. These projections are adapted to engage within the grooves 14 and hold the said blocks 20 from longitudinal movement with respect to the casing. Interposed between the longitudinally extending but relatively stationary blocks 20 or 20 and 21 are the longitudinally extending plates or members 19. These members or plates are preferably of substantially I-section, the width of the said blocks being substantially equal to the opening between the top and bottom walls of the casing. The flanged heads 19ᵇ of the plates or members 19 serve at one end to give an increased bearing area against the follower of the draft rigging and at the opposite end serve to interlockingly engage the ends of the plates 20 so as to hold the plates 19 in assembled position. The outer ends of the plates 19 extend beyond the open end of the casing a predetermined amount. This amount may be varied to suit the condition of service, the amount of the extension of the plates being the limit of movement permitted the coupler or drawbar 5ª during the operation of the same.

Interposed between each inclined side wall 13 of the casing and the adjacent face of one of the blocks 20 is the wedge block 22. Each of these blocks is preferably provided with an interlocking shoulder 22ª similar in function to the shoulders 19ᵇ of the plates 19 heretofore described. The wedge blocks 22 are preferably of the same length as the plates or members 19 although this arrangement may be varied to suit the conditions of service if desired. The inner ends of the blocks 21, the plates 19 and the wedge blocks 22 preferably lie in the same plane and are adapted to engage the outer face of the follower 24ª. This follower is centrally provided with an opening 24ᵇ through which the stem 18 of the plunger 16 is adapted to project or extend.

Between the inner face of the follower 24 and the inner end of the casing is the spring 26 which hereinafter will be termed the release spring and interposed between the inner face of the said follower and a washer or follower 27 which bears against the nut 18ª is the friction producing spring 28.

It is obvious from an inspection of the drawings that the rate at which the spring 28 is compressed may be varied by changing the angle of the wedge blocks 22 and the coacting faces of the casing, or by changing the angle of the wedge faces of the central plunger and the angle of the coacting faces of the blocks 21.

The casing 12 may be and preferably is provided with inwardly projecting ribs 29 which serve to guide the follower 24 in its movements.

The parts of the cushioning mechanism may be assembled as follows: The spring 26 is first entered into the casing and then the follower 24$^a$ is inserted. The blocks 20 and 21 are then entered singly through the grooves 15 and then moved transversely into position within the grooves 14. The plunger 16 is then inserted through the open end of the casing and the blocks 20 and 21 moved over until sufficient room is afforded between the same to permit the passage of the enlarged ends 19$^a$ and 22$^a$ respectively of the blocks 19 and 22, after which the spring 28 is inserted through the opening 30 in the closed end of the casing 12 and the washer 27 and the nut 18$^a$ then applied and this nut screwed up until the desired pressure is applied through the wedging faces 17 and 23 and the parts are all forced to their normal position, as shown in Figure 3.

The operation of the device being identical under either buffing or draft strains with the exception that in one case, as in buffing the friction blocks 19 and 22 are forced into the casing while in draft strains the casing is forced over the friction blocks, it will only be necessary to describe the operation in one direction and taking for example the operation under a buffing force with the parts in the position illustrated in Fig. 2, it will be seen that an inward movement of the follower will force the wedges 22 and the blocks 19 into the casing. This inward movement will produce a lateral movement of all of the blocks 22, 19, 20 and 21 and this inward movement or transverse movement of the blocks will cause the wedging faces 23 of the blocks 21 to move down in the wedging faces 17 of the plunger and since the blocks 21 are held from longitudinal movement by the engagement of the lateral extending lugs thereof in the grooves 14, this transverse movement will cause a longitudinal movement of the plunger 16, thus compressing the friction producing spring 28 from the rear end of the same, but simultaneously with this movement transversely of the casing the blocks 19 have been forced into and longitudinally of the casing, forcing the follower 24$^a$ rearwardly, thus compressing the spring 26 between the follower and the rear of the casing and causing increased or a differential pressure on the friction producing spring 28. It will, of course, be understood that the continued movement of the longitudinally movable members will cause a constantly increasing lateral pressure, augmenting the frictional resistance of the draft gear from the beginning to the limit of movement of the follower plate. It will be observed that the spring 26 while adding its resistance to the capacity of the draft gear in no way affects the frictional resistance of the parts, hence on a release of the buffing force the spring 26 is free to exert its energy to return the parts to normal position. The rapid return of these parts will be resisted however by the friction produced by the spring 28 and by this means a gradual and a frictional release action is obtained.

Having now fully described a single embodiment of my invention which has been chosen to illustrate the operation of same, what I claim and desire to secure by Letters Patent is:—

1. In a draft rigging, the combination with a friction casing provided with oppositely inclined inner faces, of a plurality of wedging friction members engaging said inner faces of the casing and adapted to be moved longitudinally of the said casing, and means within the said casing for forcing said members into engagement therewith, said means including a wedging member and a plurality of longitudinally movable friction members, said wedging member being actuated by a movement of said wedging friction members and being movable in a direction opposite to the movement of the said members.

2. In a draft rigging, the combination with a casing, a plurality of sets of friction members, of a friction producing spring within said casing, followers engaging opposite ends of said spring, one set of friction members engagng one of said followers and another set of said members being arranged to actuate the other follower, said first named set of friction members being movable longitudinally of said spring.

3. In a draft rigging, the combination with a casing, of a plurality of sets of friction members and a friction producing spring, followers engaging opposite ends of said spring, one set of said friction members engaging said casing and one of said followers and being movable longitudinally therewith, another set of said friction members being arranged to actuate said other follower.

4. In a draft rigging, the combination with a casing, of friction members and a friction producing spring, a follower engaging one end of said spring, some of the friction members being movable longitudinally of the casing and other friction members being movable transversely thereof, the said longitudinally movable friction members being arranged to engage said follower, the longitudinal movement of the said members causing a compression of said spring from the end thereof adjacent said members and the transverse movement of said transversely movable friction members causing a compression of the said spring from the opposite end.

5. In a draft rigging, the combination with a casing, of friction members and a friction producing spring, some of the friction members being movable longitudinally and transversely and some of said friction members being movable transversely only, and means in connection with said longitudinally movable members for moving the same transversely, said means also serving to move the transversely movable members, the movement of said friction members with respect to said casing causing a differential compression of the said spring.

6. In a draft rigging, the combination with a casing having an open end, said casing being provided with oppositely disposed inwardly converging side walls, a pair of projecting wedges formed with inclined faces adapted to cooperate with the said inclined faces of the said casing, said wedges being movable longitudinally and transversely of the said casing, a series of friction members also movable longitudinally and transversely and an interposed series of transversely movable friction members and a friction producing spring, a movable abutment for one end of said spring, a centrally arranged wedge member and means for connecting said abutment with said centrally arranged wedge member, said centrally arranged wedge member being interposed between a plurality of wedge members and being adapted to be forced longitudinally of said casing upon a movement of said wedge members, the movement of said centrally arranged wedge being diametrically opposite to the movement of said projecting wedges.

7. In a draft rigging, the combination with a casing, of a plurality of parallel springs, friction elements within the said casing, said springs being each compressible at one end by the movement of the said friction elements with respect to said casing, one of said springs being compressible coextensive with the movement of said friction elements, means for compressing the other of the said springs from the opposite end, and means for moving said friction elements with respect to said casing.

8. In a draft rigging, the combination with a casing having a plurality of friction elements therein, and a plurality of parallel springs interposed between the casing and friction elements, only one of said springs serving to induce frictional pressure between the friction elements, the other or others serving as a release spring only and means for compressing said friction producing spring from both ends simultaneously.

9. In a draft rigging, the combination with a casing having a plurality of intercollated friction elements therein, some of said friction elements being longitudinally movable coextensively with the movement of the coupler, and means for inducing frictional pressure between the said friction elements, said means including members movable at right angles to each other.

10. In a draft rigging, the combination with a casing, of friction mechanism therein, said mechanism including a plurality of relatively movable overlapping friction plates or members each provided with friction faces parallel to the longitudinal axis of said casing, some of said members being movable coextensively with the coupler and a differentially compressed spring for producing frictional pressure between the said overlapping plates.

11. In a draft rigging, the combination with a casing having a plurality of friction elements therein, said friction elements including a plurality of longitudinally and transversely movable and a purality of transversely movable members, and a friction producing spring, said spring being simultaneously compressible at opposite ends, a compression at one end being directly induced by the longitudinal movement of some of the friction elements, and a compression at the other end being induced by the transversely movable friction elements.

12. In a draft rigging, the combination of friction elements and a plurality of springs, one of said springs being compressible coextensively with the movement of the coupler and the other of said springs being simultaneously compressed at both ends, the total compression of said spring being greater than the travel of the coupler.

13. In a draft rigging, the combination with a casing having frictional elements therein, said friction elements including overlapping longitudinally and transversely movable friction plates and pressure inducing means involving wedges having their wedging faces oppositely inclined, said longitudinally movable plates also being movable transversely of said casing.

14. In a draft rigging, the combination with a casing having a plurality of friction elements therein, said elements having friction faces parallel to the longitudinal axis of said casing and a friction producing spring, some of said elements being movable longitudinally and transversely of said casing, said friction elements including differential wedge mechanism for producing a differential compression of the said spring, some of said wedge members being movable longitudinally in opposite directions.

15. In a draft rigging, the combination with a casing, the casing being provided adjacent one end thereof with a plurality of countersunk seats, a plurality of friction elements seated in said casing and means on said elements for engaging within said seats a plurality of longitudinally movable members interposed between said first named members and each provided with oppositely directed laterally extending shoulders adapted to normally engage said first named members, and means yieldingly maintaining said members in engagement.

16. In draft rigging, the combination with a casing furnished with inclined side walls and having a plurality of friction elements therein, said elements being movable in opposite directions longitudinally of said casing, and a friction producing spring, a second spring surrounding said friction producing spring, said friction elements including differential wedge mechanism for producing a differential compression of the said friction producing spring, said surrounding spring serving as a release spring and being compressible a distance equal to the movement of the friction elements into the casing.

17. In a draft rigging, the combination with a friction casing, of friction elements cooperating with the said casing, said casing having grooves or recesses formed in the side walls thereof, said grooves extending transversely of said casing adjacent one end thereof, some of said friction elements having projections adapted to seat within said grooves, said projections constituting means for preventing relative longitudinal movement between said casing and the said friction elements.

18. In a draft rigging, the combination with a friction casing provided on opposite faces with transversely extending recesses, of friction elements within said casing, said friction elements having projections adapted to cooperate with the shoulders formed by the side walls of said recesses, and means for maintaining said friction elements in spaced relation.

19. In a draft rigging, the combination with a friction casing provided with a pair of friction faces, of means for connecting said friction faces, said means being furnished with a pair of integral shoulders extending at an angle to the said friction faces, and friction elements within said casing, some of said friction elements having means to engage said shoulders to prevent longitudinal movement of said friction elements relatively of said casing.

20. In a draft rigging, the combination with a friction casing of substantially rectangular form, friction faces formed on opposite side walls of said casing, and shoulders formed on the remaining walls of said casing and extending transversely thereof to points adjacent said friction faces, friction elements within said casing, said friction elements comprising overlapping relatively movable plates, and means on some of said friction elements for engaging said shoulders to prevent relative longitudinal movement between the said friction elements and said casing.

21. In a draft rigging, the combination with a friction casing having grooves in the side walls thereof adjacent one end, of a plurality of friction blocks, projections formed on the side edges of said blocks intermediate the ends thereof, said projections being adapted to seat within said grooves, the width of said blocks including said projections being greater than the interior width of said casing and less than the exterior width of said casing.

22. In a draft rigging, the combination with a rectangular casing, of a plurality of relatively movable friction elements therein, and means for forcing some of said elements into frictional engagement with friction faces carried by said casing, said casing having recesses therein extending transversely of said casing, a plurality of said friction blocks having projections engaging within said recesses.

In testimony whereof I affix my signature.

I. ORVILLE WRIGHT.